US006441983B1

(12) United States Patent
Philpott et al.

(10) Patent No.: US 6,441,983 B1
(45) Date of Patent: Aug. 27, 2002

(54) SYSTEM AND METHOD FOR ADJUSTING A CUTOFF FREQUENCY OF A TUNABLE FILTER EMPLOYED IN A READ CHANNEL OF A DATA STORAGE SYSTEM

(75) Inventors: Rick Allen Philpott, Rochester; Chad Edward Mitchell, Kasson, both of MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/165,750

(22) Filed: Oct. 2, 1998

(51) Int. Cl.⁷ .................................................. G11B 5/02
(52) U.S. Cl. ........................................................ 360/67
(58) Field of Search ............................ 360/46, 39, 67, 360/68, 65; 375/232, 381; 330/302–306; 327/553–555, 558; 708/322

(56) References Cited

U.S. PATENT DOCUMENTS

| | | | |
|---|---|---|---|
| 4,750,058 A | 6/1988 | Hirt et al. ...................... 360/46 |
| 5,162,678 A | 11/1992 | Yamasaki .................... 367/491 |
| 5,321,559 A | * 6/1994 | Nguyen et al. ................ 360/46 |
| 5,375,145 A | 12/1994 | Abbott et al. .................. 375/98 |
| 5,442,492 A | 8/1995 | Cunningham et al. ........ 360/46 |
| 5,463,603 A | * 10/1995 | Petersen .................... 360/67 X |
| 5,491,447 A | 2/1996 | Goetschel et al. |
| 5,519,548 A | * 5/1996 | Liepe et al. ............... 360/46 X |
| 5,572,163 A | * 11/1996 | Kimura et al. ............ 360/46 X |
| 5,631,891 A | 5/1997 | Moritsugu et al. .......... 369/124 |
| 5,831,781 A | 11/1998 | Okamura ..................... 366/31 |

FOREIGN PATENT DOCUMENTS

EP    0 521 653 A2    7/1993    ............. H03F/1/30

OTHER PUBLICATIONS

"*Automatic Gain Control with Equalizer*", IBM Technical Disclosure Bulletin, vol. 21, No. 9, pp. 3569–3570, Feb. 1979.

* cited by examiner

*Primary Examiner*—David Hudspeth
*Assistant Examiner*—K. Wong
(74) *Attorney, Agent, or Firm*—Mark A. Hollingsworth (57) ABSTRACT

An apparatus and method for calibrating a cutoff frequency of a tunable filter, such as a tunable filter coupled to a read channel of a data storage system is disclosed. A calibration circuit includes a variable gain amplifier (VGA), an envelope detector, and a tunable filter coupled therebetween. A calibration signal having a preestablished frequency representing a specified cutoff frequency associated with the tunable filter is applied to the VGA. The gain of the amplifier is adjusted until an amplitude of an output signal provided by the filter is substantially equal to a first predetermined amplitude. A cutoff frequency of the filter is then adjusted until an amplitude of an output signal provided by the filter is substantially equal to a second predetermined amplitude, at which time the desired cutoff frequency of the tunable filter is precisely established. A single cutoff frequency or the low and high cutoff freqencies of a range of cutoff frequencies may be calibrated. The envelope detector includes a number of analog comparators which are used to compare an output signal provided by the filter with predetermined voltage amplitudes provided by first and second reference voltage sources. A control circuit controls amplifier gain and adjusts the cutoff frequency of the filter. A cutoff frequency calibration circuit according to the present invention may be advantageously implemented in-situ a read channel of a disk drive system.

42 Claims, 11 Drawing Sheets

SYSTEM AND METHOD FOR ADJUSTING A CUTOFF FREQUENCY OF A TUNABLE FILTER EMPLOYED IN A READ CHANNEL OF A DATA STORAGE SYSTEM

FIELD OF THE INVENTION

The present invention relates generally to filtering a signal read from a data storage medium and, more particularly, to a system and method for calibrating a cutoff frequency of a tunable filter used for filtering a signal read from a data storage medium.

BACKGROUND OF THE INVENTION

Tunable filters, such as integrated continuous time filters (CTFs), are known to be particularly useful when implemented in the read channel of a disk drive system for purposes of filtering readback signals obtained from a data storage disk. A typical disk drive system includes a magnetic medium for storing data in magnetic form and a number of transducers used to write and read magnetic data respectively to and from the medium. Digital information is typically stored in the form of magnetic transitions on a series of concentric, spaced tracks formatted on the surface of the magnetizable rigid data storage disks.

Reading data from a specified disk location is typically accomplished by using a read element of the read/write head assembly to sense the magnetic field or flux lines emanating from the magnetized locations of the disk. As the read element passes over the rotating disk surface, the interaction between the read element and the magnetized locations on the disk surface results in the production of electrical signals, commonly referred to as readback signals, in the read element.

A filter employed in a read channel must generally be capable of accommodating variations in the data rate of the readback signals transmitted through the read channel. The ability to precisely tune such a filter is therefore of particular importance. It is generally considered imperative that a cutoff or corner frequency of a tunable filter used in such applications be adjustable with a high degree of precision. Such applications may also require that the tunable filter be adjustable within a range of selectable cutoff frequencies with high precision.

It is well understood in the art that tunable filters implemented in integrated circuits, such as VLSI chips for example, exhibit frequency response characteristics that are sensitive to technology and process variations, Technology variations, as well as factors resulting from circuit/filter design or implementation, often result in large tolerances with respect to the filter's specified cutoff frequency. Such tolerances can result in performance loss.

There exists a keenly felt need for an apparatus and method for precisely adjusting the cutoff frequency of a tunable filter to a specified frequency or frequencies. There exists a need in the disk drive system manufacturing community for such an apparatus and method suitable for implementation in-situ a disk drive system and, more particularly, in-situ a read channel of the disk drive system. The present invention fulfills these and other needs.

SUMMARY OF THE INVENTION

The present invention is directed to an apparatus and method for calibrating a cutoff frequency of a tunable filter, such as a tunable filter coupled to a read channel of a data storage system. A calibration circuit according to the present invention includes a variable gain amplifier (VGA), an envelope detector, and a tunable filter coupled between the amplifier and the envelope detector. A calibration signal having a preestablished frequency representing a specified cutoff frequency associated with the tunable filter is generated and applied to the VGA. The gain of the amplifier is adjusted until an amplitude of an output signal provided by the filter is substantially equal to a first predetermined amplitude.

A response of the filter is then adjusted until an amplitude of an output signal provided by the filter is substantially equal to a second predetermined amplitude, at which time the desired cutoff frequency of the tunable filter is precisely established. A cutoff frequency calibration procedure according to the present invention may be implemented for calibrating a single cutoff frequency or, in addition, may be implemented for calibrating the low and high cutoff frequencies of a range of cutoff frequencies associated with a tunable filter.

Adjusting the gain of the amplifier involves applying voltage control signals to the amplifier. In one embodiment, a control circuit produces digital words representative of voltage control signals which are applied to the amplifier via an N-bit gain digital-to-analog converter (DAC) and a gain control buffer or multiplexer. Adjusting the response of the filter involves adjusting the cutoff frequency of the filter, preferably while the gain of the VGA is held at the previously adjusted level. In one embodiment, the response of the filter is adjusted by applying digital calibration bits to the filter.

A circuit for calibrating a cutoff frequency of a tunable filter includes a variable gain amplifier coupled to the filter and to a calibration signal source. The filter, in one embodiment, comprises a tunable lowpass filter The calibration signal source generates a calibration signal having a preestablished frequency representative of a specified cutoff frequency of the filter. An envelope detector is coupled to the output of the filter. The envelope detector includes a number of analog comparators which are used to compare an output signal provided by the filter with each of a first reference voltage signal and a second reference voltage signal in response to a calibration signal applied to the amplifier.

A control circuit, coupled to the filter, amplifier, and envelope detector, controls the gain of the amplifier until an amplitude of an output signal provided by the filter is substantially equal to an amplitude of the first reference voltage signal. The control circuit then adjusts the cutoff frequency of the filter until an amplitude of an output signal provided by the filter is substantially equal to an amplitude of the second reference voltage signal.

In one embodiment, the control circuit is coupled to an N-bit gain DAC which, in turn, is coupled to a multiplexing circuit. The multiplexing circuit, which may be implemented as part of a gain control buffer, is coupled to the amplifier. The filter comprises a cutoff adjust input, a low cutoff frequency calibration input, and a high cutoff frequency calibration input, where each of the respective inputs is coupled to a respective output of the control circuit. The respective inputs of the filter are preferably digital inputs, and the respective outputs of the control circuit are preferably digital outputs. A cutoff frequency calibration circuit according to the present invention may be advantageously implemented in-situ a read channel of a disk drive system.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

While the invention is amenable to various modifications and alternative forms, specifics thereof have been shown by way of example in the drawings and will be described in detail hereinbelow. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION OF VARIOUS EMBODIMENTS

In the following description of the illustrated embodiments, references are made to the accompanying drawings which form a part hereof, and in which is shown by way of illustration, various embodiments in which the invention may be practiced. It is to be understood that other embodiments may be utilized, and structural and functional changes may be made without departing from the scope of the present invention.

A system and methodology in accordance with the principles of the present invention provide for high precision adjustment of a cutoff frequency of a tunable filter. In one embodiment, a tunable filter, such as a tunable lowpass filter, is provided in the read channel of a disk drive system. The cutoff frequency of the tunable lowpass filter is modifiable across a range of cutoff frequencies bounded by low and high cutoff frequencies, respectively. The range of cutoff frequencies, in accordance with one embodiment, is preferably sufficient to accommodate data rate variations in the readback signal obtained from a data storage medium of a disk drive system.

It will be readily appreciated by those skilled in the art that the circuitry and methodologies described herein may be applied in filter applications other than those employed in a read channel of a disk drive system. The skilled artisan will also recognize that the cutoff frequency calibration techniques described herein may be used in connection with a broad range of tunable filters, including, tunable bandpass and highpass filters, for example.

In accordance with one embodiment of the present invention implemented in a disk drive system, high precision calibration of the cutoff frequency of a tunable lowpass filter is accomplished using existing circuit elements of the read channel. In accordance with this embodiment, an envelope detector of the read channel is used in an unconventional manner. In particular, the envelope detector is used to provide a relative amplitude measurement of read channel signals produced during a cutoff frequency calibration procedure.

A significant advantage associated with exclusive use of existing read channel circuitry concerns the elimination of technology and process tolerances that would otherwise adversely affect the accuracy of the filter's cutoff frequency, as well as the low and high cutoff frequencies of a range of selectable cutoff frequencies. Another advantage includes eliminating any dependency on external signal processing electronics, which eliminates the need to allocate additional space to accommodate such external circuitry.

Figure 1:
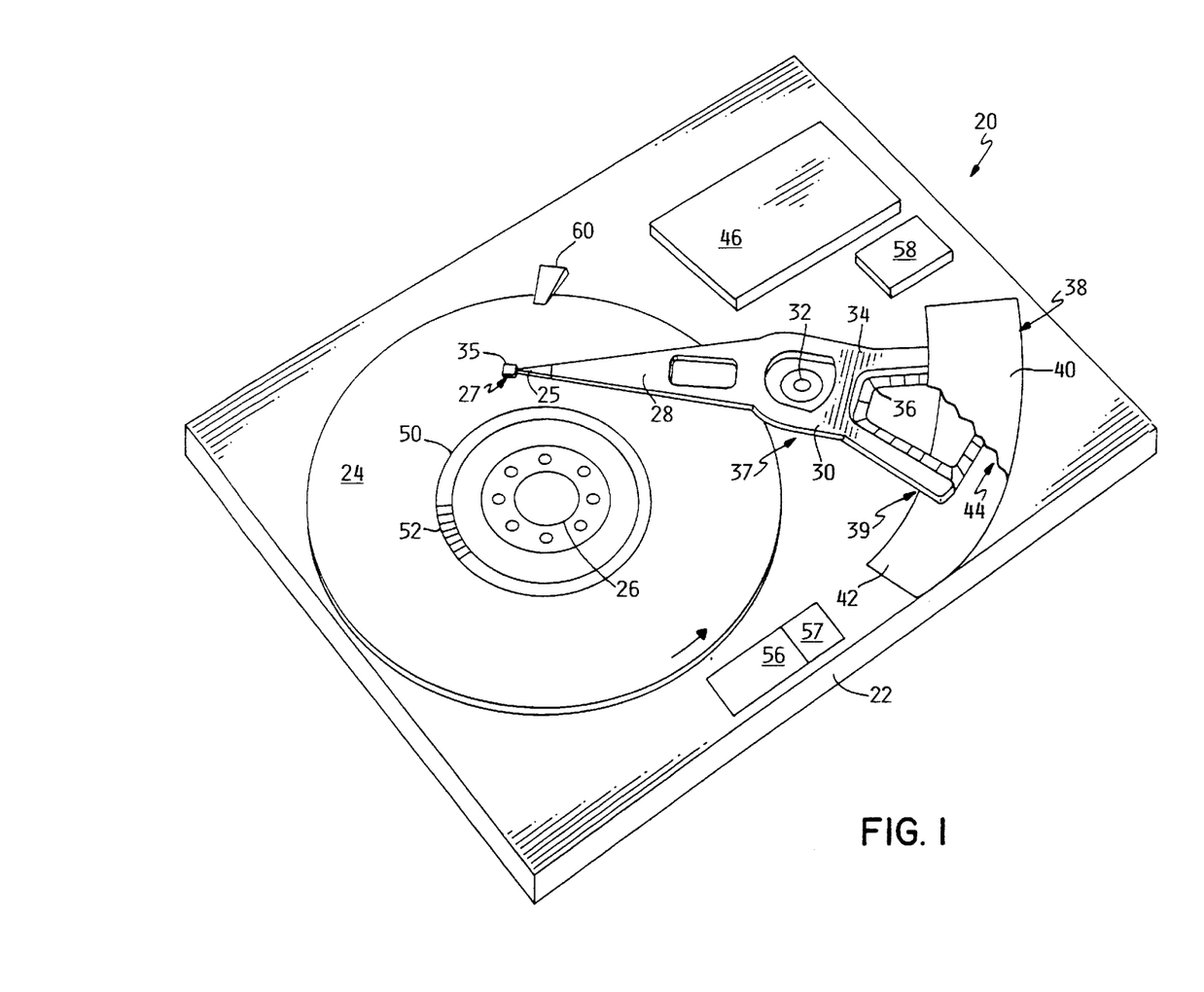
FIG. 1 is a top perspective view of a disk drive system with its upper housing cover removed.
Figure 2:
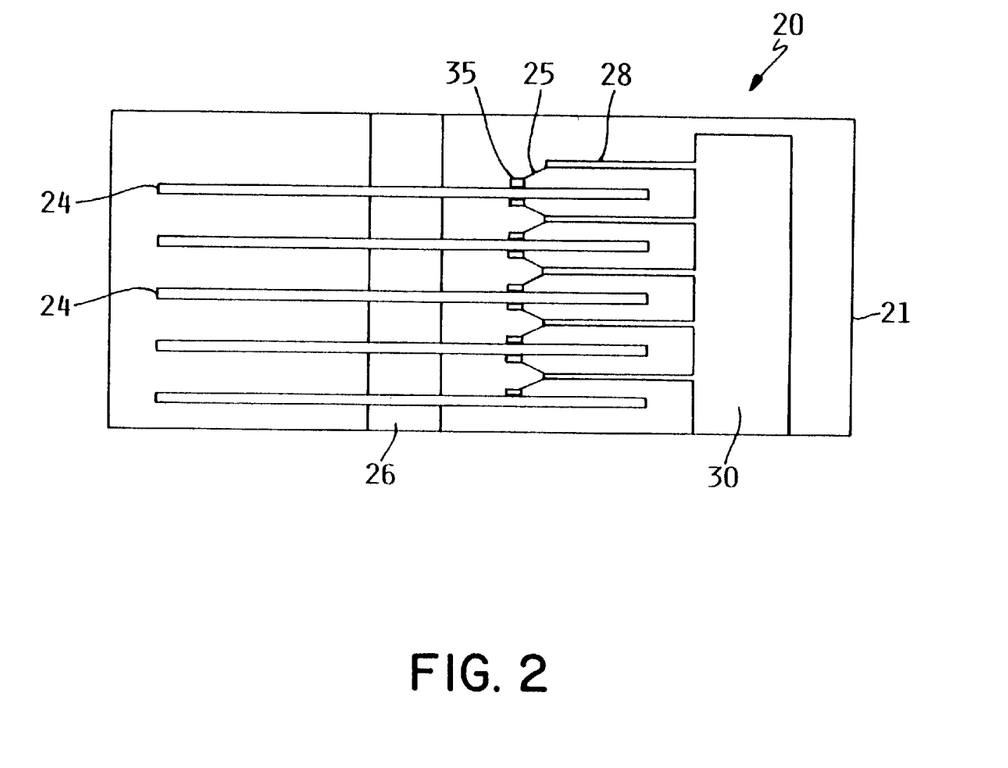
FIG. 2 is a side plan view of a disk drive system comprising a plurality of data storage disks.

Referring now to the drawings, and more particularly to FIGS. 1 and 2, there is illustrated a disk drive system 20 within which an apparatus and methodology for calibrating cutoff frequencies of a tunable filter provided in, or coupled to, a read channel according to the principles of the present invention may be implemented. The disk drive system 20 typically includes one or more rigid data storage disks 24, as is best shown in FIG. 2, which are stacked coaxially in a tandem spaced relationship, and rotate about a spindle motor 26 at a relatively high rate of rotation. As is depicted in FIG. 1, each disk 24 is typically formatted to include a plurality of spaced concentric tracks 50, with each track being partitioned into a series of sectors 52 which, in turn, are further divided into individual information fields. One or more of the disks 24 may alternatively be formatted to include a spiraled track configuration.

An actuator 30 typically includes a number of interleaved actuator arms 28 with each arm having one or more transducer 27 and slider assemblies 35 mounted to a load beam 25 for transferring information to and from the data storage disks 24. The slider 35 is typically designed as an aerodynamic lifting body that lifts the transducer 27 off the surface of the disk 24 as the rate of spindle motor rotation increases and causes the transducer 27 to hover above the disk 24 on an air bearing produced by high speed of rotation of the disk 24. A conformal lubricant may alternatively be disposed on the disk surface 24 to reduce static and dynamic friction between the slider 35 and the disk surface 24.

The actuator 30 is typically mounted to a stationary actuator shaft 32 and rotates on the shaft 32 to move the actuator arms 28 into and out of the stack of data storage disks 24. A coil assembly 36, mounted to a coil frame 34 of the actuator 30, generally rotates within a gap 44 defined between the upper and lower magnet assemblies 40 and 42 of a permanent magnet structure 38 causing the actuator arms 28, in turn, to sweep over the surface of the data storage disks 24. The spindle motor 26 typically comprises a polyphase AC motor or, alternatively, a DC motor energized by a power supply 46 and adapted for rotating the data storage disks 24.

The coil assembly 36 and the upper and lower magnet assemblies 40 and 42 of the permanent magnet structure 38 operate in cooperation as an actuator voice coil motor 39 responsive to control signals produced by a servo processor 56. The servo processor 56 controls the direction and magnitude of control current supplied to the voice coil motor 39. The actuator voice coil motor 39 produces a torquing force on the actuator coil frame 34 when control currents of varying direction and magnitude flow in the coil assembly 36 in the presence of a magnetic field produced by the permanent magnet structure 38. The torquing forces imparted on the actuator coil frame 34 cause corresponding rotational movement of the actuator arms 28 in directions dependent on the polarity of the control currents flowing in the coil assembly 36.

The servo processor 56, which cooperates with read channel electronics 57, regulates the actuator voice coil motor 39 to move the actuator arms 28 and transducers 27 to prescribed track 50 and sector 52 locations when reading and writing data to and from the disks 24. The servo processor 56 is loosely coupled to a disk drive controller 58. The disk drive controller 58 typically includes control circuitry and software that coordinate the transfer of data to and from the data storage disks 24. Although the servo processor 56, disk drive controller 58, and read channel electronics 57 are depicted as separate devices in FIG. 1, it is understood that the functionality of two or all of these devices may be embodied in a single multi-purpose processor, which typically results in a reduced component cost.

Figure 3:
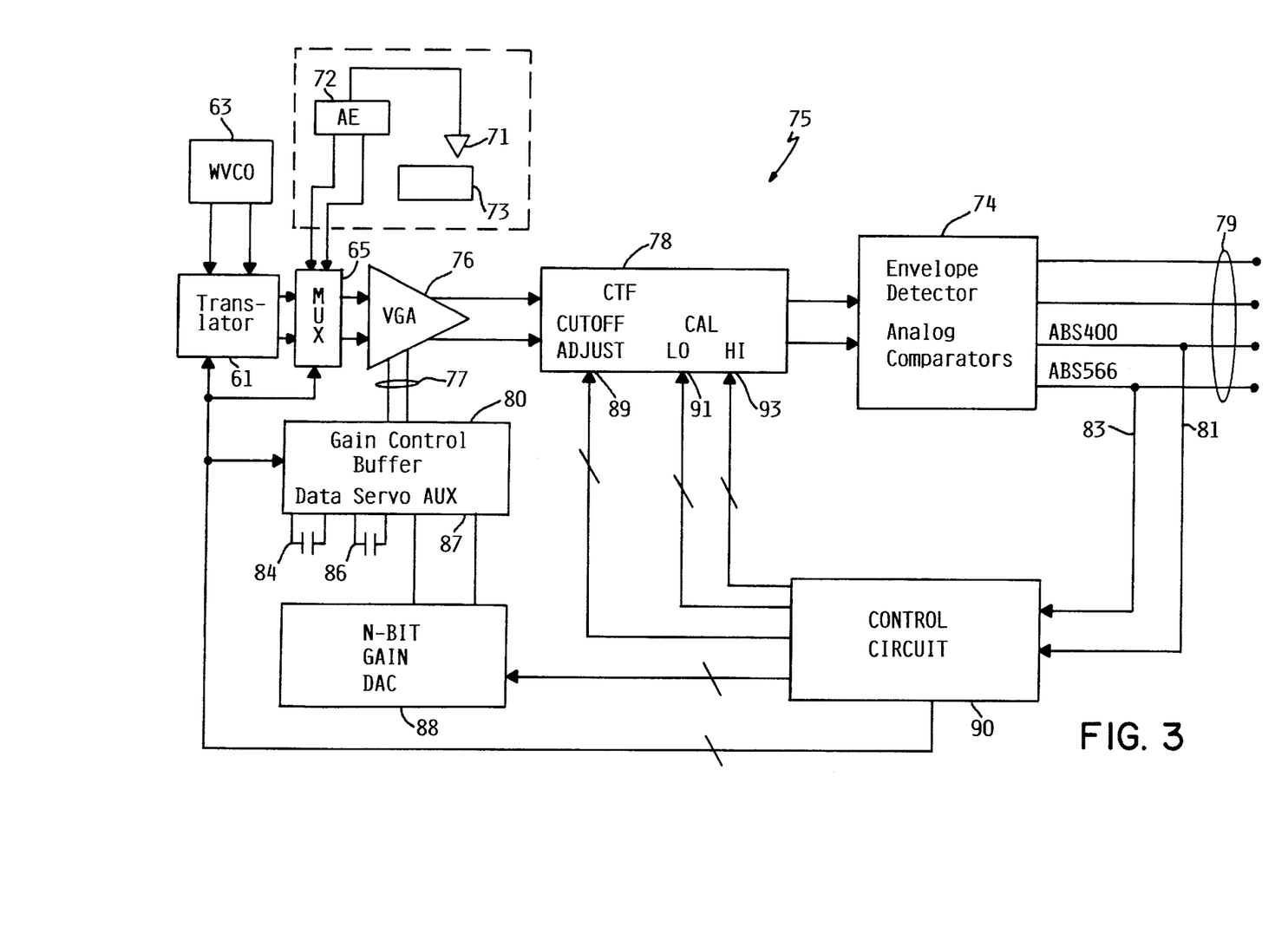
FIG. 3 is a diagram of circuitry typically provided in the read channel of a disk drive system, the circuitry including a tunable filter and circuit elements that provide for high precision adjustment of a cutoff frequency of the tunable filter in accordance with the principles of the present invention.

Turning now to FIG. 3, there is illustrated an embodiment of circuitry for calibrating a cutoff frequency of a tunable filter which, during normal operation of a disk drive system 20, receives a readback signal obtained from a data storage medium. The circuitry illustrated in FIG. 3, according to an embodiment of the present invention, represents existing circuitry provided in a typical read channel of a disk drive system which may be utilized using methodologies of the present invention for purposes of calibrating one or more cutoff frequencies of an integrated filter provided in the read channel.

In accordance with this embodiment, little or no additional circuitry or significant modification thereto is required to perform a tunable filter calibration procedure according to the present invention. For disk drive systems employing read channel circuitry differing significantly from that shown in FIG. 3, it is believed that only minor modifications or additions to existing read channel circuitry need be made in order to implement a tunable filter calibration procedure according to the present invention. It is understood that the techniques and circuitry for calibrating one or more cutoff frequencies of a tunable filter as described herein may be implemented and utilized in a wide variety of electronic systems and, in particular, in varying types of data, processing and storing systems in general.

FIG. 3 depicts a number of components that process information signals derived from a data storage disk 73 using the read element of a read/write head 71 during normal disk drive system operation. The information signals obtained from the surface of disk 73 typically represent data or servo information stored thereon, but may include other types of information. The information stored on disk 73 is typically in the form of magnetic transitions on a series of concentric or serpentine tracks. The read/write head may include a magnetoresistive (MR) read element, a giant magnetoresistive (GMR) read element, a thin-film read element, or other type of read transducer. It is understood that data storage disk 73 may store optical information, in which case read/write head 71 may include an optical read element.

During normal operation, an information signal induced in the read transducer of read/write head 71 is typically communicated to pre-amplification electronics, such as an arm electronics (AE) circuit or module 72. The AS module 72 amplifies the readback signal transmitted from the read/write head 71, typically from the microvolt range to the millivolt range. The amplified readback signal is communicated from the AE module 72 to circuitry 75 which further processes the readback signal. The elements of circuitry 75 (excluding AE module 72, read/write head 71, and disk 73) are preferably, but not necessarily, integrated within the read channel. It is noted that various components of readback signal processing circuitry 75 illustrated in FIG. 3 are components typically employed in read channel applications.

In accordance with the embodiment illustrated in FIG. 3, the readback signal processing circuitry 75 includes a variable gain amplifier 76 which is coupled to AE module 72 through a multiplexer 65. A variable gain amplifier is understood in the art as an amplifier having a gain that is alterable in response to control signals, such as voltage control signals. VGA 76 is coupled to a continuous time filter (CTF) 78 through which readback signals are communicated and filtered during normal operation. CTF 78, as will be discussed in greater detail hereinbelow, represents a tunable filter which, when properly controlled in accordance with the principles of the present invention, provides for high precision adjustment of the filter's cutoff frequency.

CTF 78 is coupled to an envelope detector 74 within which a number of analog comparators are provided. Readback signals output from the envelope detector 74 are transmitted to downstream circuitry along signal conductors 79. The envelope detector 74 includes a number of analog comparators, the output from two of which are coupled to control logic circuit 90 via conductors 81, 83. Output signals transmitted through conductors 81, 83 are used by the control logic circuit 90 when performing a cutoff frequency calibration procedure according to the present invention.

In the embodiment shown in FIG. 3, VGA 76 is used to normalize the amplitude of the readback signal received from AE module 72. For example, the readback signal amplitude at the output of VGA 76/CTF 78 may be normalized at 800 $mV_{dpp}$ (differential peak-to-peak).

In accordance with the circuit configuration shown in FIG. 3, a VGA gain control buffer 80 produces control voltage signals which are transmitted along conductors 77 to VGA 76 for purposes of adjusting the gain of VGA 76. The range of VGA control voltages typically span the range of expected voltage signals input to VGA 76. For example, VGA control voltages ranging between −400 mV to +400 mV corresponds to an operating gain range of the VGA that permits normalization of the readback signal to 800 mV$_{dpp}$.

The gain control buffer 80 includes a data gain capacitor 84 and a servo gain capacitor 86. It is noted that the voltages developed respectively across gain capacitors 84, 86 are representative of integrated automatic gain control voltages. It will be appreciated that gain control buffer 80 may, in a less complex embodiment, be representative of a multiplexer.

Gain control buffer 80 includes an auxiliary port 87 which is coupled to an output of an N-bit gain DAC 88. Gain DAC 88 produces output control voltage signals in response to digital words received from control logic circuit 90. Gain DAC 88 forces selected control voltages into the auxiliary port 87 of gain control buffer 80 which, in turn, transmits the gain control signals to VGA 76. As such, control logic circuit 90 effectively controls the gain of VGA 76 during a cutoff frequency calibration procedure according to the present invention. It is understood that the components depicted as individual circuit elements in FIG. 3, and other figures, may alternatively be integrated within one or more multiple-purpose components. For example, N-bit gain DAC 88 shown in FIG. 3 may be integrated within VGA gain control buffer 80.

In one embodiment of the present invention particularly well-suited for use it filtering readback signals obtained from a data storage medium, CTF 78 is configured as a tunable lowpass filter. The ability to precisely establish the cutoff frequency of CTF 78 within a range of cutoff frequencies is typically necessary in order to compensate for data rate variability in the readback signals transmitted through the read channel. An exemplary continuous time filter which may be utilized in read channel applications and controlled using the methodologies of the present invention is described in U.S. Pat. No. 5,491,447 (Goetschel et al.), the content of which is incorporated herein by reference.

Figure 4:
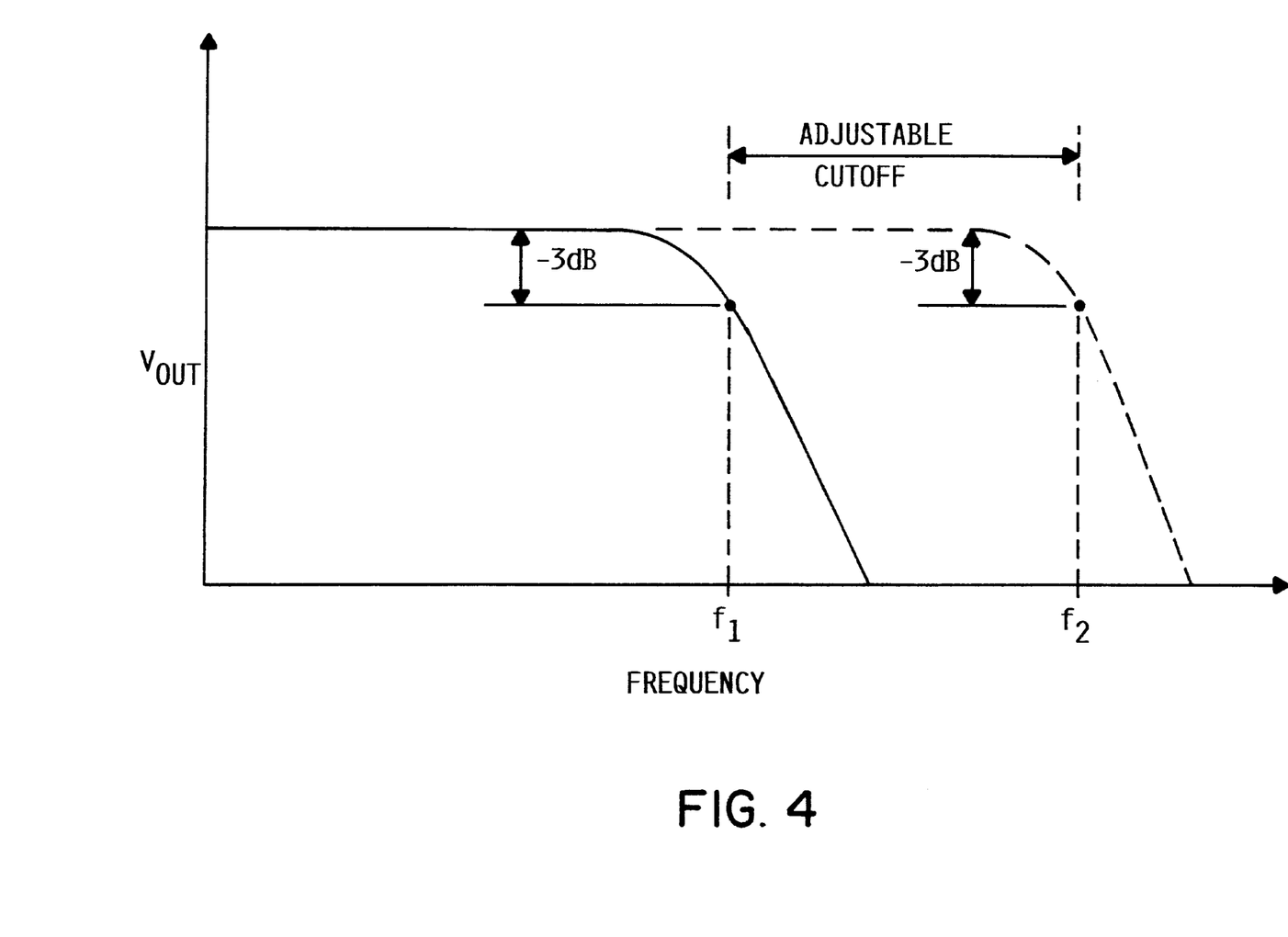
FIG. 4 is a graphical illustration of the frequency response of a tunable lowpass filter having a cutoff frequency that is adjustable according to an embodiment of the present invention.

For purpose of illustration, and not of limitation, reference is made to FIG. 4 which characterizes the frequency response of CTF 78 shown in FIG. 3 as a function of CTF output voltage. FIG. 4 illustrates the tunable nature of CTF 78, by which the cutoff or corner frequency of the filter's lowpass response is adjustable within a range of frequencies bounded by a low cutoff frequency, $f_1$, and a high cutoff frequency, $f_2$.

CTF 78 includes a cutoff adjust input 89, a low calibration bit input 91, and a high calibration bit input 93, each of which is coupled to a corresponding output of the control logic circuit 90. The cutoff adjust input 89 is used to select a desired cutoff frequency. Due to factors such as technology and process variations, a selected CTF cutoff frequency often differs from the actual CTF cutoff frequency. The low and high calibration bit inputs 91, 93 are used to precisely tune CTF 78 so that the actual cutoff frequency of CTF 78 matches the selected cutoff frequency. Control logic circuit 90 generates digital words which are transmitted to the cutoff adjust input 89, low calibration bit input 91, and high calibration bit input 93 of CTF 78 to control the frequency response (e.g., cutoff frequency) of CTF 78.

It will be immediately apparent to one skilled in the art that precisely calibrating desired low and high cutoff frequencies, $f_1$ and $f_2$, of a tunable filter is a difficult undertaking in view of inherent technology factors and circuit implementation factors, for example. Further, it may be necessary to modify the low and high cutoff frequencies, $f_1$ and $f_2$, of a tunable filter when read channel electronics or operating requirements are modified.

Figure 5:
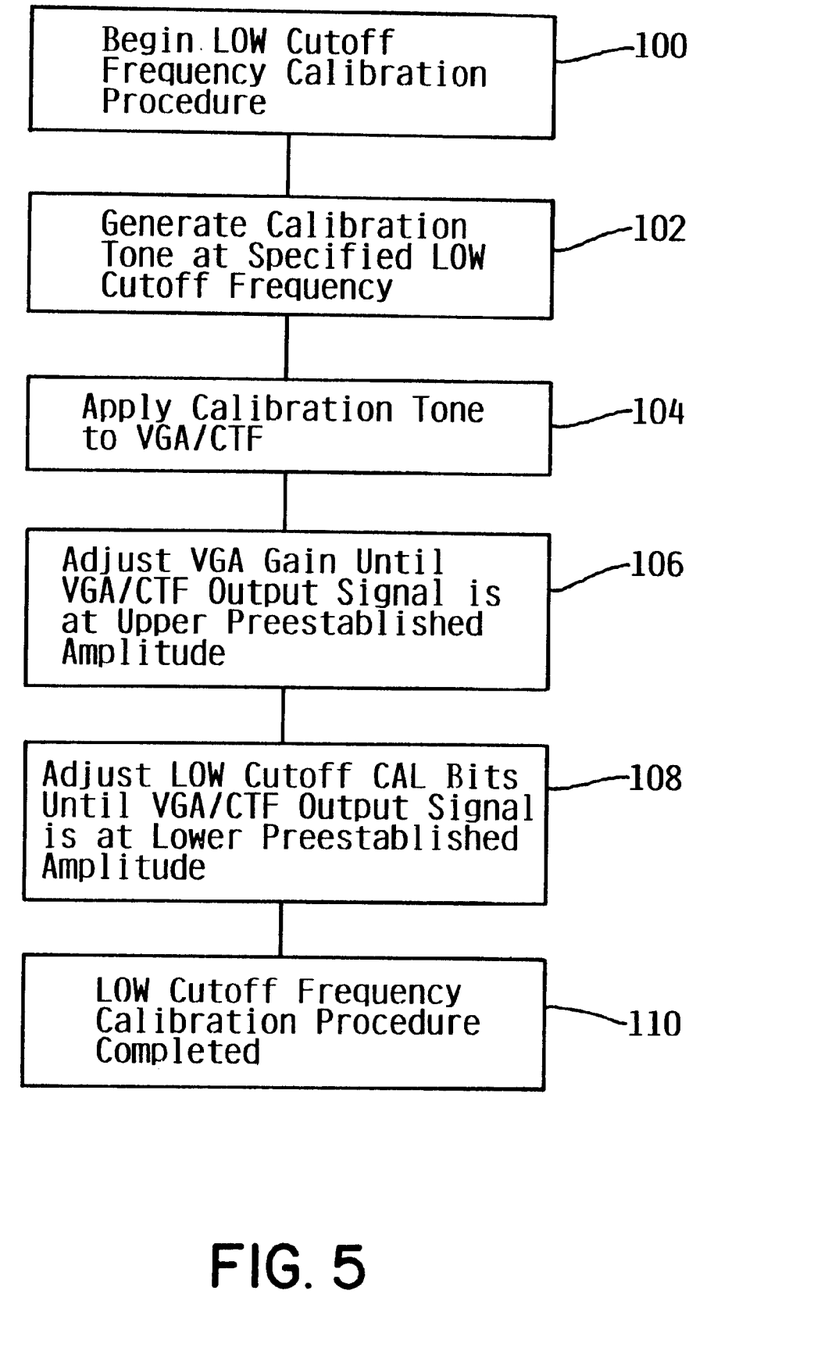
FIG. 5 depicts in flow diagram form several steps involving the calibration of a cutoff frequency representing the low end of a range of cutoff frequencies associated with a tunable lowpass filter according to the present invention.

FIG. 5 depicts in flow diagram form several steps involving the calibration of the low cutoff frequency of a range of cutoff frequencies associated with a tunable lowpass filter according to the present invention, such as CTF 78 shown in FIG. 3. When a low cutoff frequency calibration procedure is initiated 100, a calibration signal or tone is generated 102 at a specified low cutoff frequency, $f_1$. The low cutoff frequency, $f_1$, may be established using a calibration tone at 20 MHz, for example, but may be lower depending on the slowest read data rate or servo rate.

The calibration tone is applied 104 to VGA 76 and CTF 78. The gain of VGA 76 is then adjusted 106 until an output signal from the VGA/CTF 76, 78 reaches a preestablished upper amplitude. Low cutoff calibration bits are transmitted from control logic circuit 90 to the low calibration bit input 91 of CTF 78 and are adjusted lo until the VCA/CTF output signal is at a lower preestablished amplitude. Adjusting the VGA/CTF output signal to match the lower preestablished amplitude results in precisely tuning the low cutoff frequency of CTF 78 to the desired frequency, $f_1$.

Figure 6:
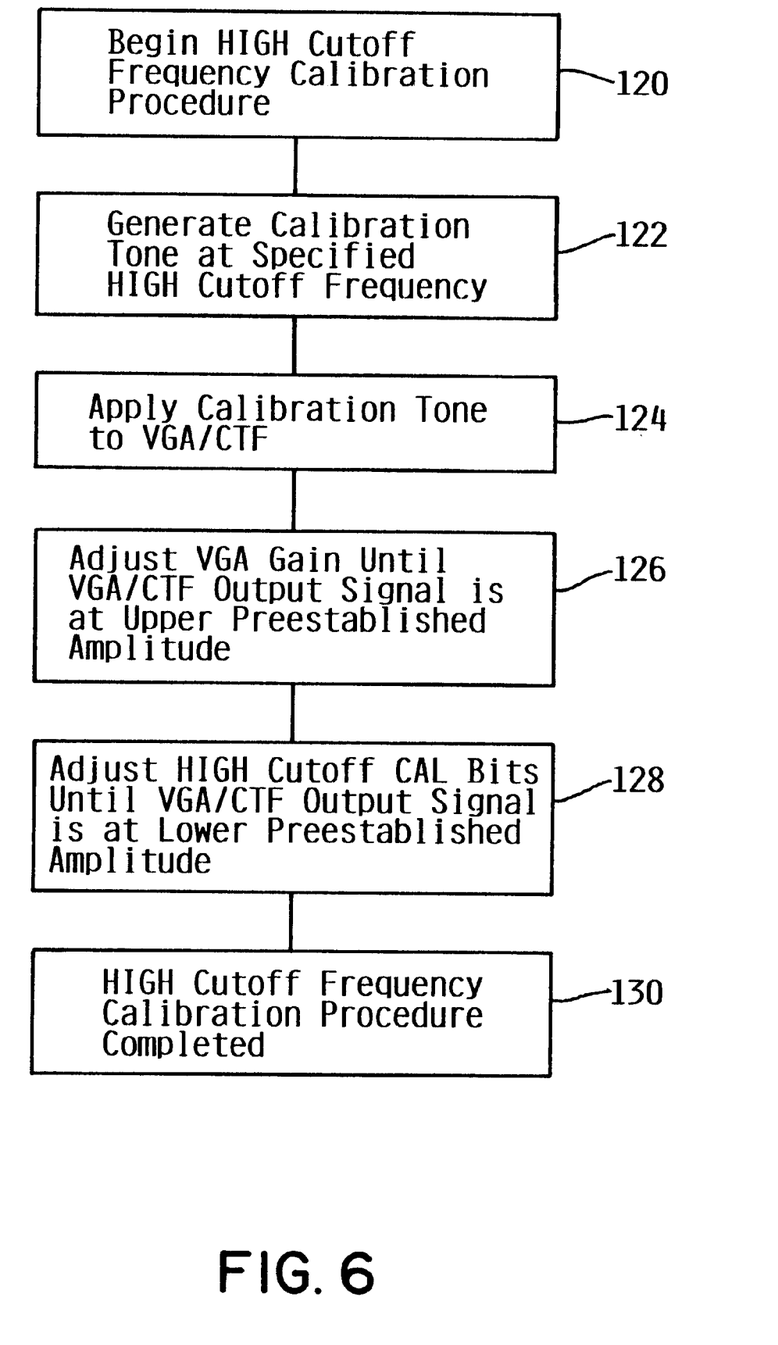
FIG. 6 depicts in flow diagram form several steps involving the calibration of a cutoff frequency representing the high end of a range of cutoff frequencies associated with a tunable lowpass filter according to the present invention.

FIG. 6 illustrates several steps involving the calibration of the high cutoff frequency of a range of cutoff frequencies associated with a tunable lowpass filter according to the present invention. After initiating 120 the high cutoff frequency calibration procedure, a calibration tone is generated 122 at a specified high cutoff frequency. The high cutoff frequency, such as frequency $f_2$ shown in FIG. 4, may represent a tone at 400 MHz, for example, but may be higher depending on the maximum read data rate. The calibration tone is applied 124 to VGA 76 and CTF 78.

The gain of VGA 76 is then adjusted 126 until an output signal from the VGA/CTF 76, 78 reaches a preestablished upper amplitude. High cutoff calibration bits are transmitted from control logic circuit so to the high calibration bit input 93 of CTF 78 and are adjusted 128 until the VGA/CTF output signal is at a lower preestablished amplitude. Adjusting the VGA/CTP output signal to match the lower preestablished amplitude results in precisely tuning the high cutoff frequency of CTF 78 to the desired frequency, $f_2$.

It is understood that the low and high cutoff frequency calibration procedures respectively depicted in FIGS. 5 and 6 may each be implemented individually for calibrating a respective low or high cutoff frequency. The low and high cutoff frequency calibration procedures may also be implemented in combination for calibrating respective low and high cutoff frequencies of a range of cutoff frequencies associated with a tunable filter.

Figure 7:
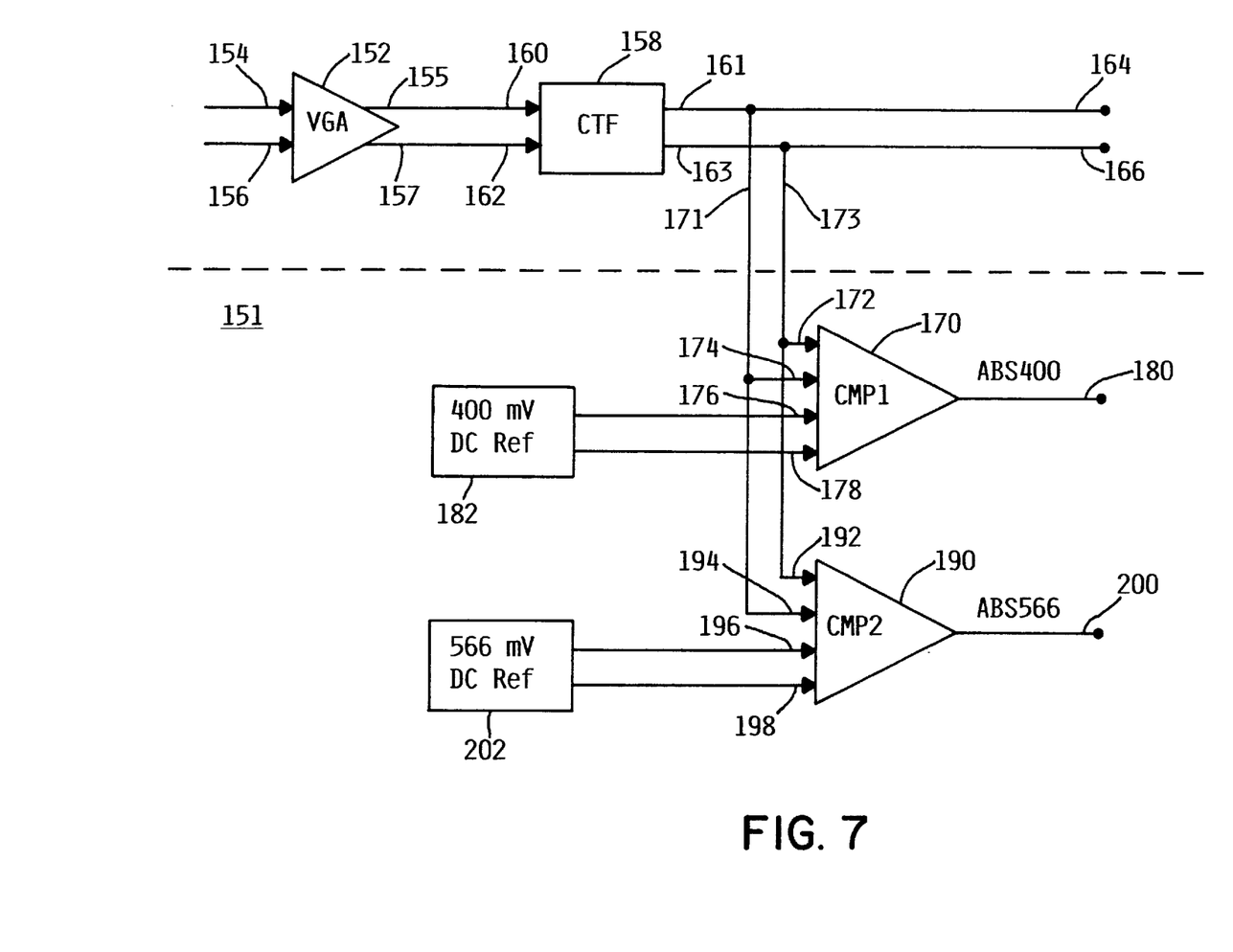
FIG. 7 illustrates circuitry associated with an envelope detector provided in the read channel of a disk drive system for calibrating a cutoff frequency of a tunable filter coupled to the envelope detector in accordance with an embodiment of the present inventions.

FIGS. 7–11 illustrate calibration circuitry and methodologies for calibrating a tunable filter employed in a read channel of a disk drive system in accordance with one embodiment of the present invention. In accordance with this embodiment, it is assumed that VGA 152 and CTF 158 shown in FIG. 7 are substantially equivalent in terms of configuration and function to VGA 76 and CTF 78 illustrated in FIG. 3.

Referring to FIG. 7, VGA 152 is depicted as including a pair of inputs 154, 156 for receiving a differential input signal, such as a readback signal obtained from a data storage medium or a calibration tone. Outputs 155, 157 of VGA 152 are coupled to inputs 160, 162 of CTF 158. Signals developed at outputs 161, 163 of CTF 158 are transmitted to downstream circuitry via lines 164, 166 and to circuitry 151 of an envelope detector via lines 171, 173.

Envelope detector circuitry 151 includes comparators 170 and 190 which are respectively coupled to DC reference voltage sources 182, 202, Comparator 170 includes inputs 172, 174, which are respectively coupled to lines 173, 171, and inputs 176, 178, which are coupled to DC reference voltage source 182. DC reference voltage source 182 supplies a 400 mV differential reference voltage to inputs 17G, 178 of comparator 170. Comparator 190 includes inputs 192, 194, which are respectively coupled to lines 173, 171, and inputs 196, 198, which are coupled to DC reference voltage source 202. DC reference voltage source 202 supplies a 566 mV differential reference voltage to inputs 196, 198 of comparator 190.

Figure 8:
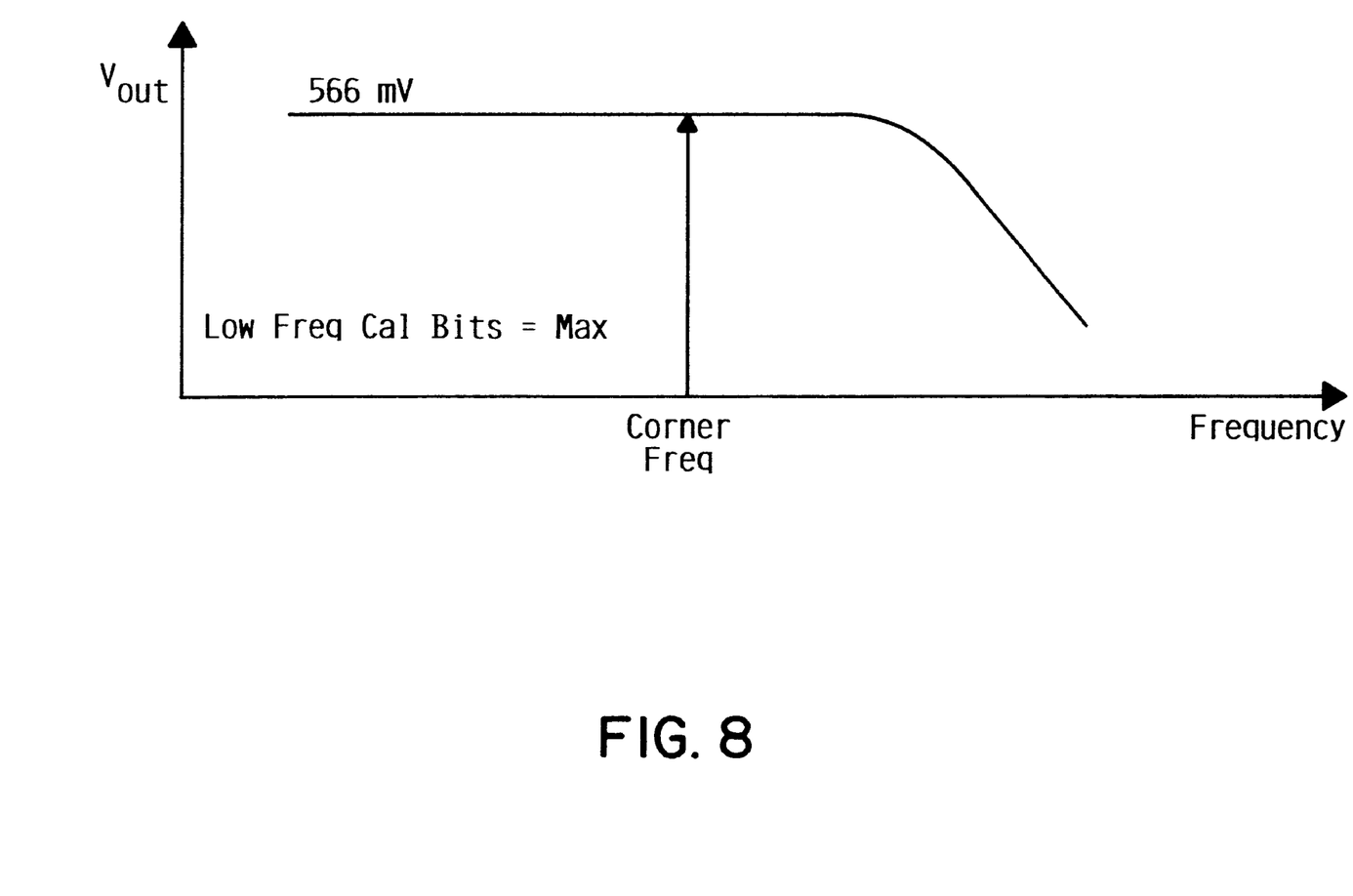
FIGS. 8 and 9 are graphical representations of the frequency response of a tunable filter subject to a cutoff frequency calibration procedure in accordance with an embodiment of the present invention.
Figure 9:
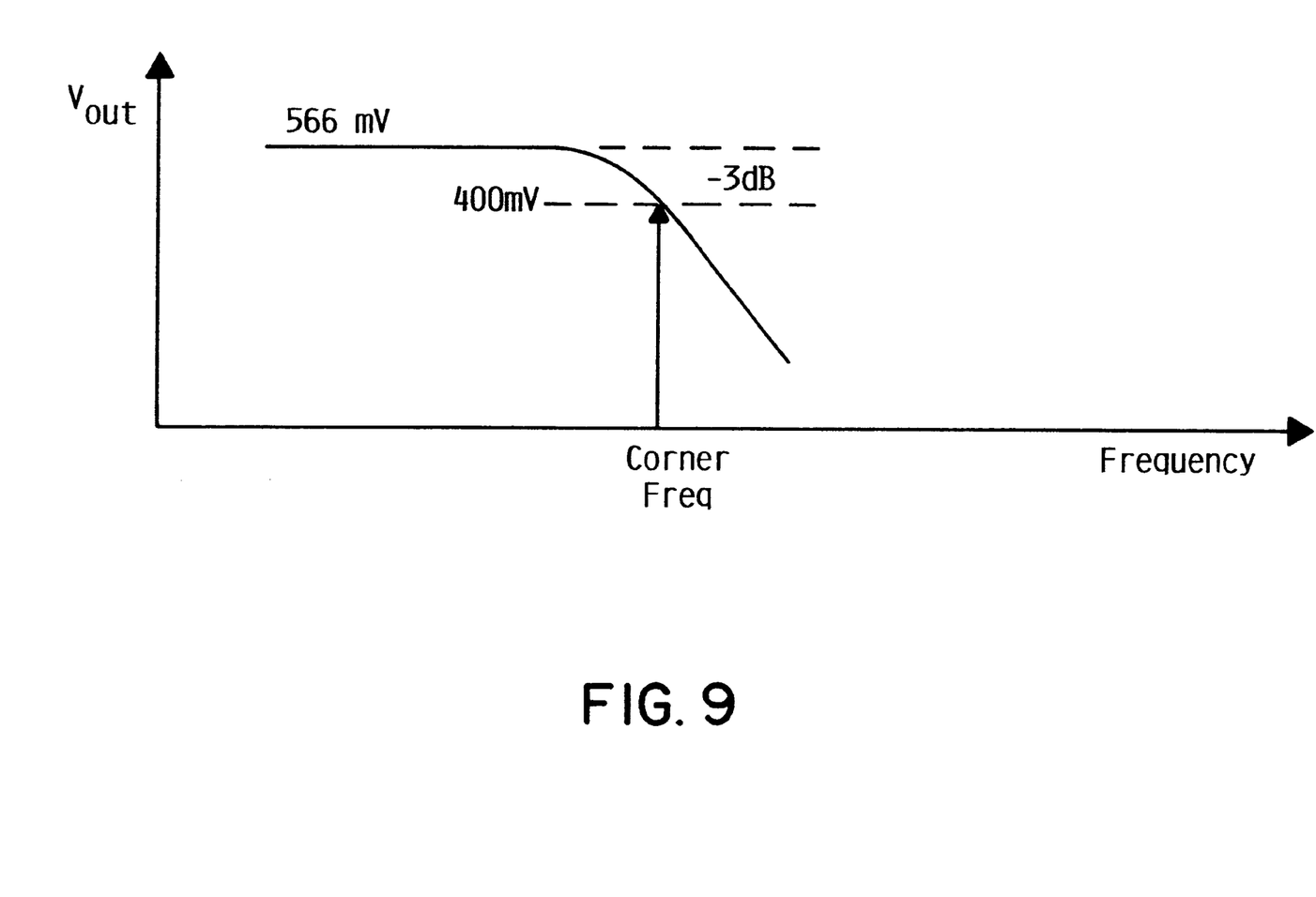

In this illustrative example, and as depicted in FIGS. 8 and 9, the DC differential reference voltage amplitudes of 400 mV and 566 mV are used by the envelope detector circuitry 151 to precisely tune CTF 158 at a desired cutoff frequency, also referred to as the −3 dB down frequency, as is indicated in the following equation:

$$\text{Amplitude} = 3.02 \text{ dB} + 20 \times \log[(400 \text{ mV})/(566 \text{ mV})] \qquad [1]$$

Figure 10:
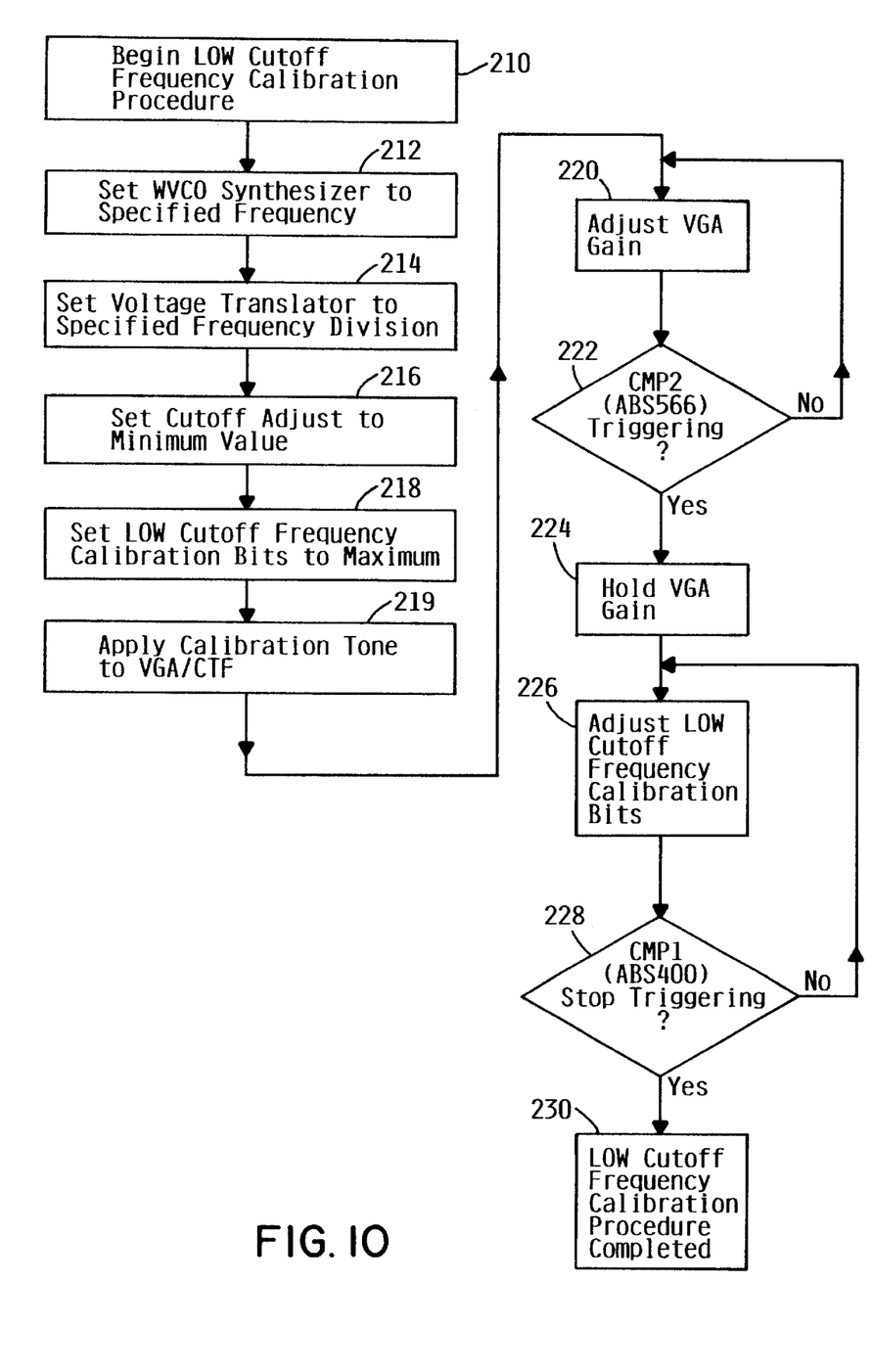
FIG. 10 depicts in flow diagram form several steps involving the calibration of a cutoff frequency representing the low end of a range of cutoff frequencies associated with a tunable lowpass filter in accordance with an embodiment of the present invention.

FIG. 10 illustrates various steps involving the calibration of the low cutoff frequency of a range of cutoff frequencies associated with CTF 158 in accordance with this embodiment. Upon initiating 210 a low cutoff frequency calibration procedure, the synthesizer of a write voltage controlled oscillator (WVCO), such as WVCO 63 shown in FIG. 3, is set 212 to a specified frequency. A voltage translator, such as translator 61 shown in FIG. 3, is set 214 to a specified frequency division. The WVCO 63 and voltage translator 61 cooperate to produce a low cutoff frequency calibration tone at a desired frequency, such as frequency $f_1$ shown in FIG. 4.

Cutoff adjust bits are supplied to the cutoff adjust input (not shown) of CTF 158 to set 216 the low cutoff frequency of the range of cutoff frequencies to a minimum value. Low cutoff frequency calibration bits are transmitted to the low calibration bit input (not shown) of CTF 158 to set 218 the low calibration bits to a maximum value. The low cutoff frequency calibration tone is then applied 219 to the differential inputs 154, 156 of VGA 152.

The gain of VGA 152 is adjusted 220 by transmission of appropriate gain control signals until comparator 190 begins triggering 222, i.e., the output 200 of comparator 190 changes state, such as between logic levels 0 and 1 for example. It is noted that output 200 of comparator 190 transitions from logic level 0 to 1, or vice versa, when the differential voltage across inputs 192, 194 exceeds 566 mV. It is further noted that output 180 of comparator 170 transitions from logic level 0 to 1, or vice versa, when the differential voltage across inputs 172, 174 exceeds 400 mV.

The gain of VGA 152 is then held 224 at the level which produced the state change at output 200 of comparator 190. The low frequency calibration bits supplied to CTF 158 are adjusted 226 until output 180 of comparator 170 stops triggering 228, at which point the low cutoff frequency of CTF 158 has been precisely tuned 230 to the desired frequency, $f_1$.

Figure 11:
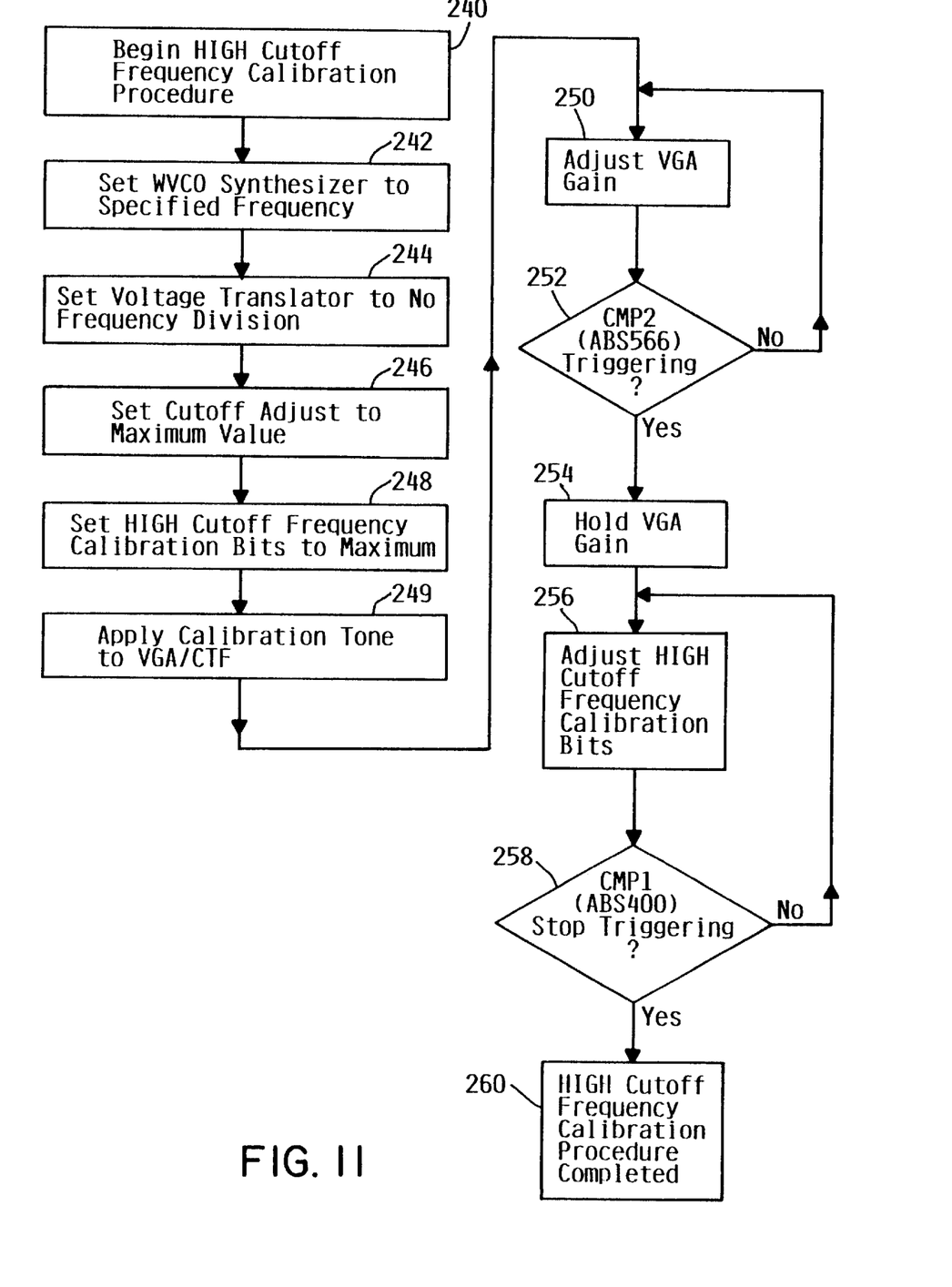
FIG. 11 depicts in flow diagram form several steps involving the calibration of a cutoff frequency representing the high end of a range of cutoff frequencies associated with a tunable lowpass filter in accordance with an embodiment of the present invention.

FIG. 11 illustrates various steps involving the calibration of the high cutoff frequency of a range of cutoff frequencies associated with CTF 158 in accordance with this embodiment. After initiating 240 a high cutoff frequency calibration procedure, the synthesizer of WVCO 63 is set 242 to a specified frequency. In the circuit configuration shown in FIG. 3, voltage translator 61 is set 244 to preclude frequency division of the signal produced by WVCO 63. WVCO 63 and voltage translator 61 cooperate to produce a high cutoff frequency calibration tone at a desired frequency, such as frequency $f_2$ shown in FIG. 4.

Cutoff adjust bits are supplied to the cutoff adjust input of CTF 158 to set 246 the high cutoff frequency of the range of cutoff frequencies to a maximum value. High cutoff frequency calibration bits are transmitted to the high calibration bit input of CTP 158 to set 248 the high calibration bits to a maximum value. The high cutoff frequency calibration tone is then applied 249 to the differential inputs 154, 156 of VGA 152.

The gain of VGA 152 is adjusted 250 until comparator 190 begins triggering 252, and is held 254 at this level during adjustment of the high frequency calibration bits. The high frequency calibration bits supplied to CTF 158 are adjusted 256 until output 180 of comparator 170 stops triggering 258, at which point the high cutoff frequency of CTF 158 has been precisely tuned 260 to the desired frequency, $f_2$.

The foregoing description of the various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of calibrating a cutoff frequency of a tunable filter coupled to a read channel of a data storage system, the read channel including a variable gain amplifier, an envelope detector, and the tunable filter coupled between the amplifier and the envelope detector, the method comprising:

generating a calibration signal having a preestablished frequency, the preestablished frequency representing a specified cutoff frequency associated with the tunable filter;

applying the calibration signal to the amplifier;

adjusting a gain of the amplifier until an amplitude of an output signal provided by the filter is substantially equal to a first predetermined amplitude; and adjusting a response of the filter until an amplitude of an output signal provided by the filter is substantially equal to a second predetermined amplitude.

2. The method according to claim 1, wherein the first predetermined amplitude is greater than the second predetermined amplitude.

3. The method according to claim 1, wherein adjusting the gain of the amplifier comprises applying voltage control signals to the amplifier.

4. The-method according to claim 1, wherein adjusting the gain of the amplifier comprises producing a digital word representative of a voltage control signal and applying the voltage control signal to the amplifier.

5. The method according to claim 1, wherein adjusting the response of the filter comprises adjusting the cutoff frequency of the filter.

6. The method according to claim 1, wherein adjusting the response of the filter comprises adjusting the cutoff frequency of the filter while holding the gain of the amplifier at a gain such that the amplitude of the output signal provided by the filter is substantially equal to the first predetermined amplitude.

7. The method according to claim 1, wherein adjusting the response of the filter comprises applying digital calibration bits to the filter.

8. The method according to claim 1, wherein adjusting the gain of the amplifier comprises adjusting the gain of the amplifier using the envelope detector.

9. The method according to claim 1, wherein adjusting the gain of the amplifier comprises adjusting the gain of the amplifier until a comparator provided in the envelope detector and coupled to the filter triggers at the first predetermined amplitude.

10. The method according to claim 1, wherein adjusting the response of the filter comprises adjusting the response of the filter using the envelope detector.

11. The method according to claim 1, wherein adjusting the response of the filter comprises adjusting the cutoff frequency of the filter until a comparator provided in the envelope detector and coupled to the filter triggers at the second predetermined amplitude.

12. The method according to claim 1, wherein the first and second predetermined amplitudes are used to calculate the cutoff frequency of the filter.

13. The method according to claim 1, wherein the filter comprises a tunable lowpass filter.

14. A method of calibrating low and high cutoff frequencies of a range of cutoff frequencies for a tunable filter coupled to a read channel of a data storage system, the read channel including a variable gain amplifier, an envelope detector, and the tunable filter coupled between the amplifier and the envelope detector, the method comprising:

a a first calibration method, comprising:
generating a low calibration signal having a preestablished low frequency, the preestablished low frequency representing a specified low cutoff frequency associated with the tunable filter;
applying the low calibration signal to the amplifier;
adjusting a gain of the amplifier until an amplitude of an output signal provided by the filter is substantially equal to a first predetermined amplitude; and
adjusting a response of the filter until an amplitude of an output signal provided by the filter is substantially equal to a second predetermined amplitude; and a second calibration method, comprising;
generating a high calibration signal having a preestablished high frequency, the preestablished high frequency representing a specified high cutoff frequency associated with the tunable filter;
applying the high calibration signal to the amplifier;
adjusting a gain of the amplifier until an amplitude of an output signal provided by the filter is substantially equal to the first predetermined amplitude; and
adjusting a response of the filter until an amplitude of an output signal provided by the filter is substantially equal to the second predetermined amplitude.

15. The method according to claim 14, wherein the first predetermined amplitude is greater than the second predetermined amplitude.

16. The method according to claim 14, wherein the first calibration procedure is performed prior to the second calibration procedure.

17. The method according to claim 14, wherein adjusting the gain of the amplifier with respect to each of the first and second calibration methods comprises producing a digital word representative of a voltage control signal and applying the voltage control signal to the amplifier.

18. The method according to claim 14, wherein adjusting the response of the filter with respect to each of the first and second calibration methods comprises adjusting the response of the filter while holding the gain of the amplifier at a gain such that the amplitude of the output signal provided by the filter is substantially equal to the first predetermined amplitude.

19. The method according to claim 14, wherein adjusting the response of the filter with respect to each of the first and second calibration methods comprises applying digital calibration bits to the filter.

20. The method according to claim 14 wherein adjusting the gain of the amplifier with respect to each of the first and second calibration methods comprises adjusting the gain of the amplifier using the envelope detector.

21. The method according to claim 14, wherein adjusting the gain of the amplifier with respect to each of the first and second calibration methods comprises adjusting the gain of the amplifier until a comparator provided in the envelope detector and coupled to the filter triggers at the first predetermined amplitude.

22. The method according to claim 14, wherein adjusting the response of the filter with respect to each of the first and second calibration methods comprises adjusting the response of the filter using the envelope detector.

23. The method according to claim 14, wherein adjusting the response of the filter with respect to each of the first and second calibration methods comprises adjusting the response of the filter until a comparator provided in the envelope detector and coupled to the filter triggers at the second predetermined amplitude.

24. The method according to claim 14, wherein the first and second predetermined amplitudes are used to calculate the cutoff frequency of the filter.

25. The method according to claim 14, wherein the filter comprises a tunable lowpass filter.

26. A circuit for calibrating a cutoff frequency of a filter, comprising:
a tunable filter;
a variable gain amplifier coupled to the filter and a signal source, the signal source generating a calibration signal having a preestablished frequency representative of a specified cutoff frequency of the filter;
an envelope detector coupled to the filter, the envelope detector, in response to the calibration signal applied to the amplifier, comparing an output signal provided by the filter with each of a first reference voltage signal and a second reference voltage signal; and
a control circuit coupled to the filter, amplifier, and envelope detector, the control circuit controlling a gain of the amplifier until an amplitude of an output signal provided by the filter is substantially equal to an amplitude of the first reference voltage signal, and the control circuit adjusting the cutoff frequency of the filter until an amplitude of an output signal provided by the filter is substantially equal to an amplitude of the second reference voltage signal.

27. The circuit of claim 26, wherein the envelope detector comprises:
a first comparator coupled to a first reference voltage source that produces the first reference voltage signal; and
a second comparator coupled to a second reference voltage source that produces the second reference voltage signal.

28. The circuit of claim 26, wherein the envelope detector comprises:
a first comparator having a first differential input coupled to a first differential reference voltage source, a second differential input coupled to a differential output of the filter, and a logic output coupled to the logic circuit; and
a second comparator having a first differential input coupled to a second differential reference voltage source, a second differential input coupled to a differential output of the filter, and a logic output coupled to the logic circuit.

29. The circuit of claim 26, wherein the amplitude of the first reference voltage signal is larger than the amplitude of the second reference voltage signal.

30. The circuit of claim 26, wherein:
   the control circuit is coupled to an N-bit gain digital-to-analog converter (DAC);
   the DAC is coupled to a multiplexing circuit; and
   the multiplexing circuit is coupled to the amplifier.

31. The circuit of claim 30, wherein the multiplexing circuit comprises a gain control buffer.

32. The circuit of claim 26, wherein the filter comprises a cutoff adjust input, a low cutoff frequency calibration input, and a high cutoff frequency calibration input, each of the respective inputs coupled to a respective output of the control circuit.

33. The circuit of claim 32, wherein the respective inputs of the filter comprise digital inputs, and the respective outputs of the control circuit comprise digital outputs.

34. The circuit of claim 26, wherein the filter comprises a tunable lowpass filter.

35. The circuit of claim 26, wherein the circuit is implemented in-situ a read channel of a disk drive system.

36. A data storing system, comprising:
   a data storage disk;
   a data transfer head including a read transducer coupled to a read channel;
   an actuator for providing relative movement between the head and the disk; and
   a circuit coupled to the read channel for calibrating a cutoff frequency of a filter, the circuit comprising:
      a tunable filter;
      a variable gain amplifier coupled to the filter and a signal source, the signal source generating a calibration signal having a preestablished frequency representative of a specified cutoff frequency of the filter;
      an envelope detector coupled to the filter, the envelope detector, in response to the calibration signal applied to the amplifier, comparing an output signal provided by the filter with each of a first reference voltage signal and a second reference voltage signal; and
      a control circuit coupled to the filter, amplifier, and envelope detector, the control circuit controlling a gain of the amplifier until an amplitude of an output signal provided by the filter is substantially equal to an amplitude of the first reference voltage signal, and the control circuit adjusting the cutoff frequency of the filter until an amplitude of an output signal provided by the filter is substantially equal to an amplitude of the second reference voltage signal.

37. The system of claim 36, wherein the envelope detector comprises:
   a first comparator coupled to a first reference voltage source that produces the first reference voltage signal; and
   a second comparator coupled to a second reference voltage source that produces the second reference voltage signal.

38. The system of claim 36, wherein the envelope detector comprises:
   a first comparator having a first differential input coupled to a first differential reference voltage source, a second differential input coupled to a differential output of the filter, and a logic output coupled to the logic circuit; and
   a second comparator having a first differential input coupled to a second differential reference voltage source, a second differential input coupled to a differential output of the filter, and a logic output coupled to the logic circuit.

39. The system of claim 36, wherein;
   the control circuit is coupled to an N-bit gain digital-to-analog converter (DAC);
   the DAC is coupled to a multiplexing circuit; and
   the multiplexing circuit is coupled to the amplifier.

40. The system of claim 36, wherein the filter comprises a cutoff adjust input, a low cutoff frequency calibration input, and a high cutoff frequency calibration input, each of the respective inputs coupled to a respective output of the control circuit.

41. The system of claim 36, wherein the filter comprises a tunable lowpass filter.

42. The system of claim 36, wherein the circuit is implemented in-situ the read channel of the disk drive system.

* * * * *